C. Grun.
Skirt Elevator.

N° 58406. Patented Oct. 2, 1866.

Witnesses.
F. A. Jackson,
Wm Trewrn

Inventor.
Christian Grun
Per Munn & Co
Attorneys

UNITED STATES PATENT OFFICE.

CHRISTIAN GRÜN, OF NEW YORK, N. Y.

IMPROVEMENT IN ELEVATORS FOR LADIES' SKIRTS.

Specification forming part of Letters Patent No. 58,406, dated October 2, 1866.

*To all whom it may concern:*

Be it known that I, CHRISTIAN GRÜN, of the city, county, and State of New York, have invented a new and Improved Dress-Elevator; and I do hereby declare that the following is a full, clear, and exact description thereof, which will enable others skilled in the art to make and use the same, reference being had to the accompanying drawings, forming part of this specification, in which—

Figure 1:
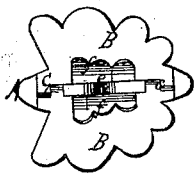
Figure 2:
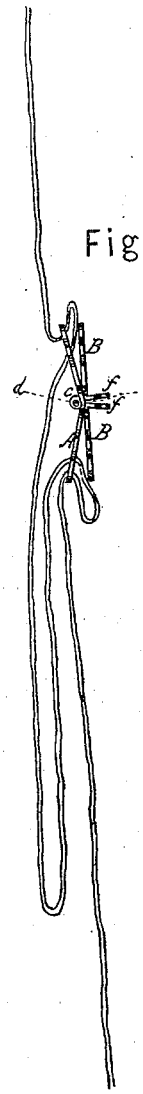
Figure 3:
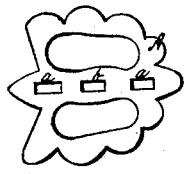
Figure 4:
Figure 5:
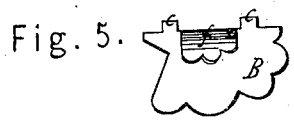

Figure 1 represents a front view of this invention. Fig. 2 is an end view of the same. Figs. 3, 4, and 5 show the different parts of the elevator detached.

Similar letters of reference indicate like parts.

This invention relates to an improvement in that class of dress-elevators which are composed of a V-shaped bed-plate with two spring-jaws, which are so arranged that a portion of the dress can be clamped between each jaw and the bed-plate; and this improvement consists in the manner of securing the spring-jaws and the spring to the V-shaped bed-plate.

A designates the V-shaped bed-plate, which is perforated in its corner with three mortises, $a$ $a'$ $b$, as shown in Fig. 3. The mortises $a$ $a'$ are intended to admit the eyes $c$, which project from the inner edge of the spring-jaws B, as shown in Figs. 4 and 5, and after said eyes have been introduced into the mortises, two eyes in each mortise, a wire, $d$, is passed through them and the joint is made.

On the wire $d$ is wound the spiral spring $e$, the ends of which pass up through the mortise $b$ and bear on the projecting lips or finger-pieces $f$ of the spring-jaws, as shown in Figs. 1 and 2. By these means the spring-jaws, together with the eyes $c$ and the finger-pieces, can be made out of one piece, and they are readily and easily secured to the V-shaped bed-plate; and, furthermore, the spring $e$ is readily applied, and it acts on the spring-jaws to the best possible advantage.

I disclaim everything described and claimed in Letters Patent granted to Mrs. H. H. Cole, February 27, 1866; but

What I claim as new, and desire to secure by Letters Patent, is—

The mortises $a$ $a'$ $b$ in the V-shaped bed-plate A, in combination with the eyes $c$ on the spring-jaws, and with the spring $e$, constructed and operating substantially as and for the purpose set forth.

The above specification of my invention signed by me this 10th day of July, 1866.

CHRISTIAN GRÜN.

Witnesses:
WM. F. MCNAMARA,
W. HAUFF.